United States Patent
Antoniu et al.

(10) Patent No.: US 6,301,227 B1
(45) Date of Patent: Oct. 9, 2001

(54) SYSTEMS AND METHODS FOR ALLOWING TRANSMISSION SYSTEMS TO EFFECTIVELY RESPOND TO AUTOMATED TEST PROCEDURES

(75) Inventors: Tudor Antoniu, San Jose, CA (US); Michael C. Rafko, Great Falls, VA (US); Edward Ho, Sunnyvale, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 0 days.

(21) Appl. No.: 09/139,010

(22) Filed: Aug. 24, 1998

(51) Int. Cl.[7] .............................. H04L 12/26; H01M 3/22
(52) U.S. Cl. ............................ 370/241; 370/251; 379/29
(58) Field of Search ........................... 379/27, 5, 6, 22, 379/24, 25, 26, 28, 29, 30, 31; 370/241, 247, 248, 251, 524

(56) References Cited

U.S. PATENT DOCUMENTS

| | | | |
|---|---|---|---|
| 5,054,050 | * 10/1991 | Burke et al. | 379/29 |
| 5,208,803 | * 5/1993 | Conforti et al. | 370/241 |
| 5,301,050 | * 4/1994 | Czerweic et al. | 379/29 |
| 5,712,898 | * 1/1998 | Hall, III et al. | 379/29 |

* cited by examiner

Primary Examiner—Alpus H. Hsu
Assistant Examiner—Afsar M. Qureshi (57) ABSTRACT

The invention provides a cost-effective system and method for testing telephone lines connected to transmission systems, such as Subscriber Line Multiplexer systems. The invention uses the same pair of wires for transmission and test. According to one embodiment of the invention, a system for allowing a test procedure to be performed on a communication system is provided. The communication system has a transmission line for connecting to telephone exchange and a subscriber line for connecting to a communication set. In the system of the invention, a detector is coupled to the transmission line for detecting test signals on the transmission line. A bypass circuit is coupled between the transmission and subscriber lines for allowing the test signals to bypass the communication system. Also, a discriminator is coupled to the subscriber line for discriminating a connection status of the communication set. Moreover, a controller is coupled to the detector, the discriminator and the bypass circuit for activating the bypass circuit in accordance with detection of the test signals and the connection status of the communication set. This allows the test signals to bypass the communication system and connect to the communication set and perform measurements. The system of invention additionally includes a status circuit, coupled to the controller, for reproducing, upon discriminating a predetermined connection status of the communication set, the predetermined connection status of the communication set for presenting to the test signals. The predetermined connection status includes off-hook and short statuses of the communication set.

41 Claims, 5 Drawing Sheets

SYSTEMS AND METHODS FOR ALLOWING TRANSMISSION SYSTEMS TO EFFECTIVELY RESPOND TO AUTOMATED TEST PROCEDURES

BACKGROUND OF THE INVENTION

The present invention generally relates to telecommunication test systems and methods, and more particularly to telecommunication tests and methods that allow transmission systems, such as Subscriber Line Multiplexer Systems to effectively respond to automatic test procedures, such as the MLT (Mechanized Loop Test).

Transmission systems have been used to provide cost-effective connections between a central office and subscribers' telephones. A Subscriber Line Multiplexer system is a type of transmission system that uses digitally multiplexed channels to connect two or more telephone subscribers to a central office. This system uses the ISDN U-interface technology, or xDSL technologies, such as HDSL (High Data Rate Subscriber Line), ADSL (Asymmetric Digital Subscriber Line) and their variations, to multiplex several voice and/or data channels over a single copper pair, in order to provide additional virtual telephone or data lines to one or more subscribers over the existing cable facilities.

When the personnel in the central office of a telephone company receives a complaint from a subscriber about telephone problems, the subscriber's line is remotely tested from the central office to verify the accuracy of the complaint and to locate defective network components. Thus, a repairing team may be dispatched to the appropriate location. This provides an efficient and economic solution for the telephone company in dealing with problems about telephone lines.

Typically, the telephone line tests are automated, and one of the most popular automated tests is known as the MLT procedure performed by an MLT system. In an MLT procedure, the MLT system applies known electrical signals on the subscriber's loop comprising the telephone line and the subscriber's telephone set and makes appropriate measurements. Based on the measurements, the MLT system can calculate the loop impedance, the parasitic impedances, as well as possible foreign voltages (i.e., voltages other than those supplied from the central office) present on the line. The MLT system reports back to the central office the results of the measurements, as well as the probable status of the line. The operator needs to know these results in order to understand the problems and take appropriate actions. For example, if the insulation between the wires of a telephone line is damaged, the impedance between wires may become very low. In this case, the transmission characteristics of the telephone line may become very poor, and the quality of the services could thus be impaired. Also, the presence of a foreign voltage due to, e.g., induction from defective high power electrical ducts, can impair the transmission characteristics of the telephone line and can even make it dangerous to use the telephone.

The MLT procedure is most effective for remote testing telephone lines without having any transmission system, such as a fiber optic transmission system, or a Subscriber Line Multiplexer System connected to the lines. If the subscriber's telephone set is not directly connected to the central office, but instead it is connected through a transmission system, the MLT system does not have direct access to the line. In such a case, when the transmission system detects the presence of an MLT signal, it feeds back to the MLT system the values of three resistors located at the subscriber's loop which represent the "signature" of the current state of the system. These three resistors are respectively connected between the ring and tip lines, the ring line and ground and the tip line and ground.

In order to present the proper signature to the MLT system, the transmission system must perform a series of self tests. If the number of lines serviced by the system is large, the remote equipment can be provided with a rather complex test head for performing elaborate tests of the subscriber's drop (i.e., the copper pair that connects the remote terminal to the subscriber). The test head can report back the results to the central office terminal for presenting the proper signatures. Because large number of lines are serviced, the per-line cost of the test head is relatively small. However, in the case of multiplexer systems with small number of lines, e.g., 2 or 4 lines, the per-line cost of the test head is very high. One solution would be to use a less sophisticated test head with simple self-test circuits. In such case, the system periodically performs (or at a time when the MLT is detected) simple tests which will establish signatures for presenting to the MLT system. However, the number of tests and the accuracy of the results obtained with these simple circuits are insufficient for detecting the problems of the telephone lines. Thus, complex circuits have to be used, which dramatically increases the cost.

Accordingly, there is a need to provide an improved and cost-effective system and method for testing telephone lines connected to transmission systems, such as Subscriber Line Multiplexer systems.

SUMMARY OF THE INVENTION

This invention provides a cost-effective system and method for testing telephone lines connected to transmission systems, such as Subscriber Line Multiplexer systems. By using the invention, the information returned by the multiplexer system is maximized when MLTs are run by the operating personnel for maintenance or failure detection purposes. The invention uses the same pair of wires for transmission and test.

According to one embodiment of the invention, a system for allowing a test procedure to be performed on a communication system is provided. The communication system has a transmission line for connecting to telephone exchange and a subscriber line for connecting to a communication set. The system of the invention comprises a detector, coupled to the transmission line, for detecting test signals on the transmission line; a bypass circuit, coupled between the transmission and subscriber lines, for allowing the test signals to bypass the communication system; a discriminator, coupled to the subscriber line, for discriminating a connection status of the communication set; and a controller, coupled to the detector, the discriminator and the bypass circuit, for activating, in accordance with detection of the test signals and the connection status of the communication set, the bypass circuit so as to allow the test signals to bypass the communication system and connect to the communication set and perform measurements.

According to another embodiment of the invention, the system of invention additionally includes a status circuit, coupled to the controller, for reproducing, upon discriminating a predetermined connection status of the communication set, the predetermined connection status of the communication set for presenting to the test signals. The predetermined connection status includes off-hook and short statuses of the communication set. The status circuit reproduces the predetermined connection status by emulating an impedance of a loop comprising the subscriber line and the communication set. The status circuit emulates a linear impedance if the connection status discriminated by the discriminator indicates a short status and a non-linear impedance if the connection status discriminated indicates an off-hook status.

According to a further embodiment of the invention, the communication system includes a second transmission line for connecting to the telephone exchange and a second subscriber line for connecting to a second communication set. In this communication system, the first transmission line transmits signals to the first subscriber line and the second transmission line transmits signals to the second subscriber line. The controller activates the bypass circuit in accordance with the connection statuses of both the communcation sets.

According to a still further embodiment of the invention, the system of the invention additionally includes a signature generator, coupled to the first and second transmission lines, for generating a signature, indicative of the communication system status, on one of the transmission lines on which the test signals are detected.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE PREFERRED EMBODIMENTS

Figure 1:
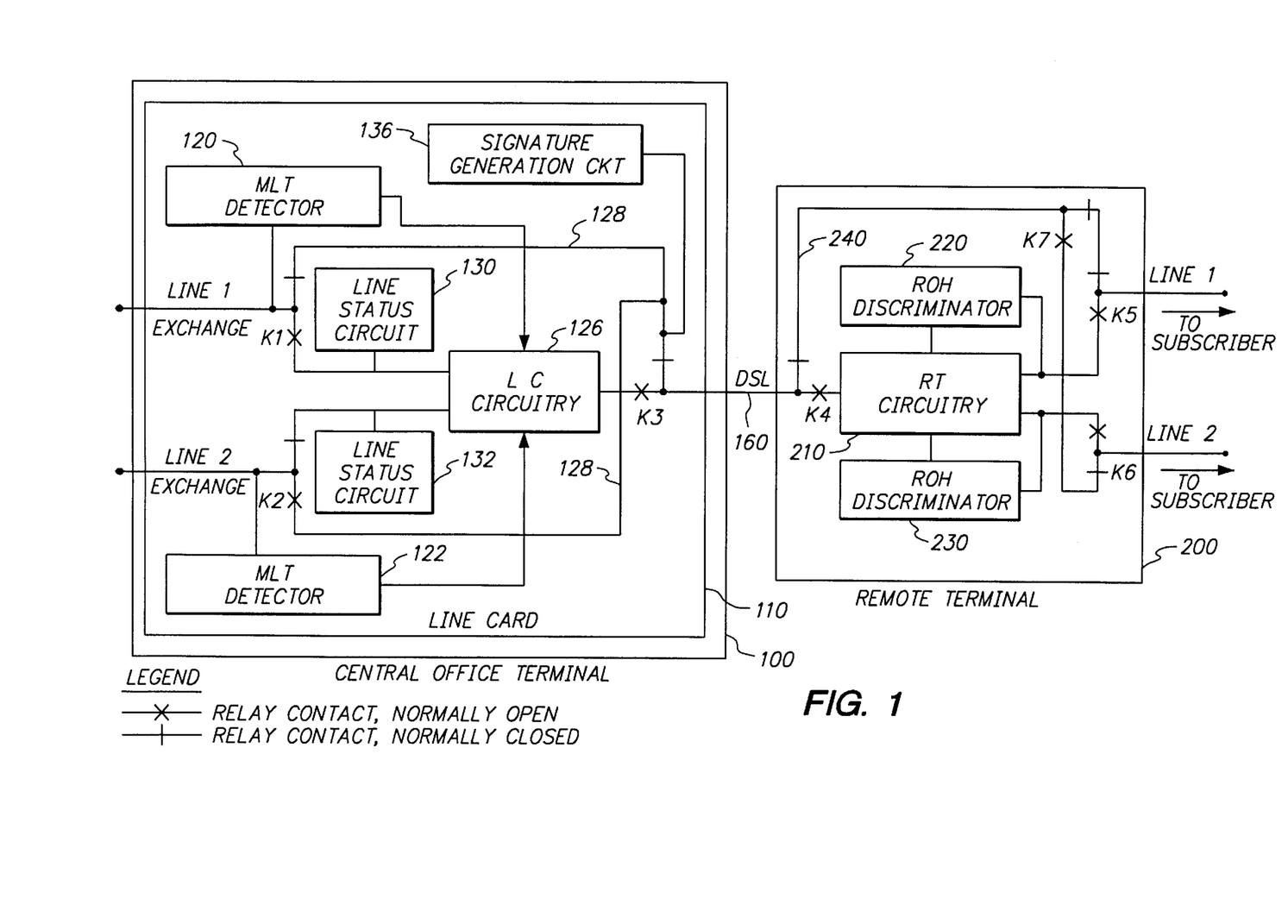
FIG. 1 shows an overall block diagram of a 2-line subscriber line multiplexer system according to an embodiment of the invention.

FIG. 1 shows an overall block diagram of a 2-line subscriber line multiplexer system according to one embodiment of the invention. It should be understood that the invention also applies to a multiplexer system with any number of lines.

As shown in FIG. 1, multiplexer system includes two terminals, a central office terminal (COT) 100 and a remote terminal (RT) 200. COT 100 is installed in a central office (CO) and includes at least one line card (LC) 110. LC 110 comprises MLT detectors 120 and 122, LC circuitry 126, line status circuits 130 and 132, signature generation circuit 136, and 2-pole line bypass relays K1, K2 and K3. Analog lines from a telephone exchange (not shown) are connected to the analog inputs of COT 100, i.e., lines 1 and 2. An MLT system (not shown) is connected to the analog inputs of COT 100 via the telephone exchange.

In LC 110, bypass relays K1, K2 and K3 in LC 110 are controlled by a microcontroller in LC circuitry 126. When operated, relay K1 connects line 1 to bypass bus 128; relay K2 connects line 2 to bypass bus 128; and relay K3 connects bypass bus 128 to a telephone line 160, known as DSL (Digital Subscriber Line) and disconnects the DSL from LC circuitry 126.

In the case where a signature has to be presented on one of the lines, an appropriate relay (K1 or K2) is operated, so that signature generator circuit 136 is connected to the bypass bus 128 without activating K3. Signature generation circuit 136 is connected to bypass bus 128 by the internal relays of signature generation circuit 136. These internal relays are controlled by the microcontroller in LC circuitry 126.

RT 200 is connected to COT 100 through DSL 160. RT 200 comprises a RT circuitry 210, ROH discriminators 220 and 230, a 1-pole DSL bypass relay K4, 2-pole line bypass relays K5 and K6 and a 2-pole latching relay K7. Communication sets, such as telephone sets (not shown) are connected to RT 200 at its analog inputs, i.e., lines 1 and 2. In FIG. 1, each of telephone lines 1 and 2 and DSL 160 includes a pair of analog lines, i.e., ring and tip lines, as will be illustrated in more detail later.

In RT 200, bypass relays K4, K5 and K6 and latching relay K7 are controlled by a microcontroller in RT circuitry 210. Bypass relay K4, when operated, connects DSL 160 to bypass bus 240. Bypass relays K5 and K6, when operated, can respectively connect lines 1 and 2 to bypass bus 240. Latching relay K7 switches between lines 1 and 2 for connecting to DSL 160.

In the normal operation, when no MLT procedure is performed on the telephone lines, lines 1 and 2 are connected to subscribers via LC circuitry 126 and RT circuitry 210, and communications among the subscribers are as usual.

When a test person starts an MLT procedure with the MLT system on one of the telephone lines, one of MLT detectors 120 and 122 detects the MLT signals and reports the detection to the microcontroller in LC circuitry 126. If the multiplexer system is in good operating condition, with all the telephone sets at the subscriber's end being on hook, LC circuitry 126 sends a message to the microcontroller in RT circuitry 210 in RT 200 to request the telephone line under test to go into a bypass state. Upon receiving the message, the microcontroller in RT 200 switches latching relay K7 on the position that corresponds to the requested line and sends an acknowledge message back to LC 110.

After receiving the acknowledgment message from RT 200, the microcontroller in LC circuitry 126 causes selected relays in LC 110 to go into a bypass state so as to connect the line under test to a corresponding bypass bus 128 or 129. In this way, the MLT system is directly connected to the subscriber's premises through DSL 160 and various tests can thus be performed to detect faults.

In FIG. 1, RT circuitry 210 is provided with a SLIC (Subscriber Line Interface Circuit) (not shown) on each telephone line. The SLIC reports to the local microcontroller in RT circuitry 210 whether there is a current flowing through the loop on the associated line. If no current is detected, it indicates that either the telephone receiver is on hook or the subscriber's drop is interrupted. In such case, when an MLT signal comes on the line, the multiplexer system will go into bypass state at both LC 110 and RT 200 so that the MLT signal can make measurements and detect whether a telephone set is present (on hook) or whether the subscriber's drop is interrupted. On the other hand, if a current is detected by the SLIC in a loop, an associated ROH discriminator 220 or 230 will measure the loop impedance and report the measurement to the local microcontroller in RT circuitry 210. The local microcontroller then reports back the measured loop impedance to the microcontroller in LC circuitry 126, which will configure an associated line status circuit 130 or 132 to emulate the measured impedance at LC 110. The emulated impedance will be linear in case of a short or nonlinear in case of a ROH(the telephone impedance when its receiver is off hook). In such case, if an MLT signal comes on the line, the MLT signal will measure the emulated impedance and reports back the proper result (short or ROH) to the MLT system. This emulated impedance represents the status of the line under test. When a fault is detected by the MLT, the telephone company may follow up with necessary repairs on the line. The details will be described later.

In the case where RT 200 is remotely powered, it loses power when LC 110 goes into bypass state. This causes bypass relays K4, K5 and K6 to switch to the bypass positions, while latching relay K7 remains at the position before the power was down and operates to select the line for bypassing.

If, at the time the MLT procedure is performed, the multiplexer system or the DSL is not in good operating condition, then signature generation circuit 136 will present an appropriate signature, i.e., a set of electrical signals, to the MLT system, indicating the system status, as will be described in detail below.

Figure 2:
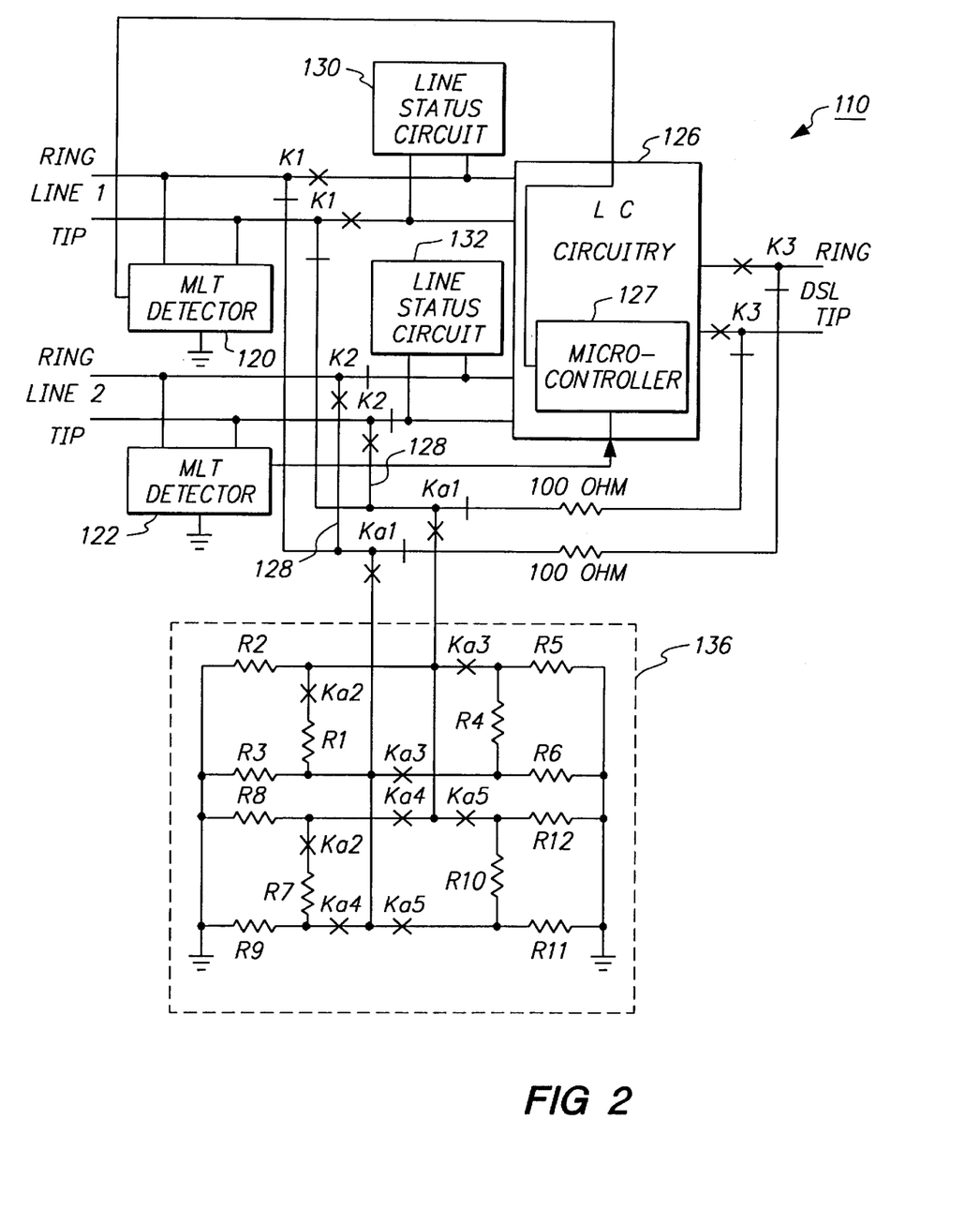
FIG. 2 shows a detailed diagram of a line card (LC) according to an embodiment of the invention.
Figure 3:
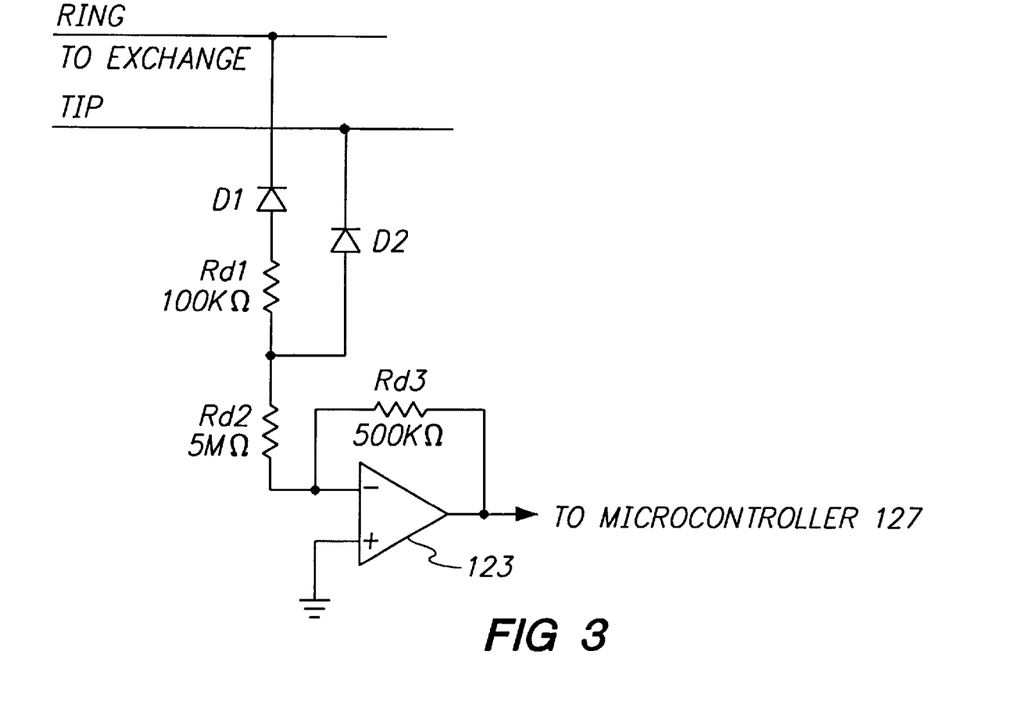
FIG. 3 shows the schematic diagram of an MLT detector according to an embodiment of the invention.
Figure 4:
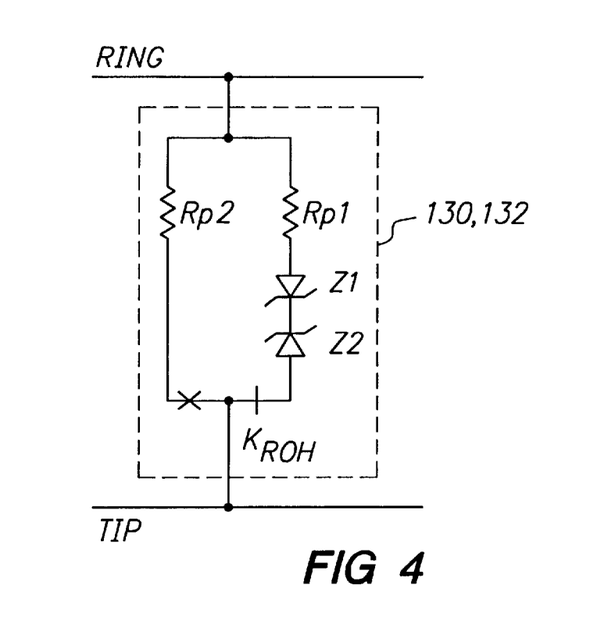
FIG. 4 shows the schematic diagram of a line status circuit according to an embodiment of the invention.

FIGS. 2, 3 and 4 are next described. FIG. 2 shows a detailed diagram of LC 110. FIGS. 3 and 4 show, respectively, the schematic diagrams of the MLT detector 120, 122 and the line status circuit 130, 132 illustrated in FIG. 2.

In FIG. 2, signature generation circuit 136 uses four relays Ka2, Ka3, Ka4 and Ka5 to select a desired signature (a group of three resistors). Relay Ka1 is used to connect the signature to bypass bus 128, as described above. Signature generation circuit 136 is designed to accommodate the applicable signatures standardized by the Bellcore TR-909 recommendation. The resistor values in circuit 136 are those specified by this recommendation and are tabulated in Table 1 below.

TABLE 1

Resistance values in signature generation circuit 136

| Resistor | Resistance value (in ohms) |
|---|---|
| R1 | 295k |
| R2 | 175k |
| R3 | 175k |
| R4 | 130k |
| R5 | 70k |
| R6 | 70k |
| R7 | 19.8k |
| R8 | 189.1k |
| R9 | 189.1k |
| R10 | 17.8k |
| R11 | 296.1k |
| R12 | 296.1k |

In FIG. 3, each MLT detector comprises a buffer 123, two diodes D1 and D2, and three resistors Rd1, Rd2 and Rd3. Diodes D1 and D2 are used to bias the relative polarities of the ring and tip leads. When the MLT system sends MLT signals on a telephone line, the associated MLT detector measures the voltage across the ring and tip lines of the telephone line under test. If the voltage value is within a predetermined range, e.g., <5V, buffer 123 outputs an MLT detection signal to microcontroller 127 in LC circuitry 126 to indicate that an MLT signal has been detected on the line.

If the multiplexer system is in good operating condition as detected by its detectors and a signaling transmission channel (both of which are not shown), and if an MLT signal is detected on one line, then whether the MLT system has fill access to the line under test depends on the connection statuses of the telephone sets connected to the two lines.

If the connection status of the telephone set on the line under test is on hook as detected by an associated SLIC and the connection status of the telephone set on the other line is either on hook or shorted, then after receiving the MLT detection signal from the MLT detector, microcontroller 127 in LC circuitry 126 will send a message to the microcontroller in RT 200 to request the telephone line under test to go into a bypass state. In such case, the system will go into a bypass state and the MLT system will have full access down to the subscriber's end on the line under test and be able to make necessary measurements, as described in the above.

If the multiplexer system is in good operating condition, and if the connection status of the telephone set on the line under test is on hook, but the connection status of the telephone set on the other line is off hook, i.e., busy, the multiplexer system will, through signature generation circuit 136, apply a signature "System Busy" on the line under test. In this case, no MLT procedure is performed in order not to disturb communication on the other busy line.

In the case where the multiplexer system is in a good operating condition and the telephone connected to the line under test is off hook as detected by an associated SLIC, the subscriber loop at the COT is closed and the system does not do anything in response to detection of an MLT signal. This is the case regardless of the connection status of the telephone set on the other line. In this case, the associated ROH discriminator discriminates whether the off-hook status is due to a real ROH or a short since the SLIC does not differentiate between the two conditions. The ROH discriminator informs the microcontroller in the LC of the discriminated connection status and then the microcontroller configures an associated line status circuit at LC 110 to emulate either the ROH or short impedance, as the case may be. This will allow the MLT signal to measure the emulated impedance and report to the MLT system the appropriate status of the line under test.

If the system is not in operating condition because of a fault in the DSL (disconnected or shorted DSL), and if the system is provided with the "fail to copper" capability (i.e., the system will cause a selected line (usually line 1) to go into a bypass state when a failure occurs) and an MLT signal is detected on that line, then the system will do nothing. Thus, the MLT system will be allowed to measure the line up to the failure point, and detect the nature and location of the failure. If the MLT signal comes on the other line instead, signature generation circuit 136 will generate an appropriate signature and the MLT system will display a message "Bad DSL", which is also provided for under a different name by Bellcore TR-909 specifications.

If the system is not in operating condition due to failure in one of the terminals (COT 100 or RT 200), then the signature generation circuit will generate an appropriate signature and the MLT system will display a message "Bad RT" or "Bad COT" to indicate where the failure is located.

If the system is not in operating condition because no RT has yet been installed. Most multiplexer systems still provide service to the subscriber's telephone when the COT is installed but the RT is not installed. This is a "COT bypass" situation where, as an example, relays K1 and K3 in FIG. 1 are not operated, and the subscriber's telephone is directly connected to the CO, via the DSL and the contacts of these relays (which bypass the LC circuitry), so that the subscriber can use the telephone on line 1 as usual, until a RT is installed and line 2 is added. If an MLT signal comes on line 1 which is connected to the subscriber's telephone, the system will do nothing and the MLT system will have full access up to the subscriber's telephone. If, instead, the MLT signal comes on line 2, which is not connected to anything, the system will generate an appropriate signature and the MLT system will display a message "CPE not provisioned", where CPE stands for Customer Premises Equipment.

If the system is in the process of start up, the signature generation circuit will generate an appropriate signature and the MLT system will display a message "System busy, try later".

The various signatures which comply with Bellcore TR-909 specifications and are generated by signature generation circuit 136 under different circumstances are next described.

As illustrated in FIG. 2, each of lines 1 and 2 can be connected to signature generation circuit 136 by activating selected bypass relays, so that a signature can be generated and presented on the appropriate line.

A signature generated by generation circuit 136 complies with Bellcore TR-909 specifications and includes a set of impedance values. These impedance values include the impedance between the tip line and the ground RTG, the impedance between the ring line and the ground RRG, and the impedance between the tip line and ring line RTG. Table 2 shows a summary of various signatures generated by the system in response to MLT signals under different circumstances.

FIG. 4 shows a detailed diagram of the line status circuit 130, 132. As shown, the MLT status circuit comprises a resistor Rp1 connected in series with zener diodes Z1 and Z2. The series combination of Rp1, Z1 and Z2 is connected to resistor Rp2 in parallel. A relay KROH is connected to the parallel circuit. The line status circuit reproduces the status of the line under test as discriminated by an associated ROH discriminator 220 or 230. Detection of the line status by the ROH discriminator will be described in connection with FIGS. 5 and 6.

When a ROH discriminator discriminates the status of the line under test as short and reports back to LC 110, microcontroller 127 operates KROH to cause the MLT system to connect to resistor Rp2. Thus, the MLT system will measure a linear resistance Rp2 between tip and ring lines, and will display a message indicating a probable short.

In the case that ROH, i.e., the line resistance value when the telephone set is off hook, is detected, microcontroller 127 operates KROH to cause the MLT system to connect to the series combination of resistor Rp1, and zener diodes Z1 and Z2. Therefore, the MLT system will measure a nonlinear impedance between tip and ring lines, which is a characteristic of an off-hook telephone. The MLT system will display the message "ROH".

In both cases, when impedance emulation is performed, the bypass relays are in the positions that would not cause the system to be bypassed.

Figure 5:
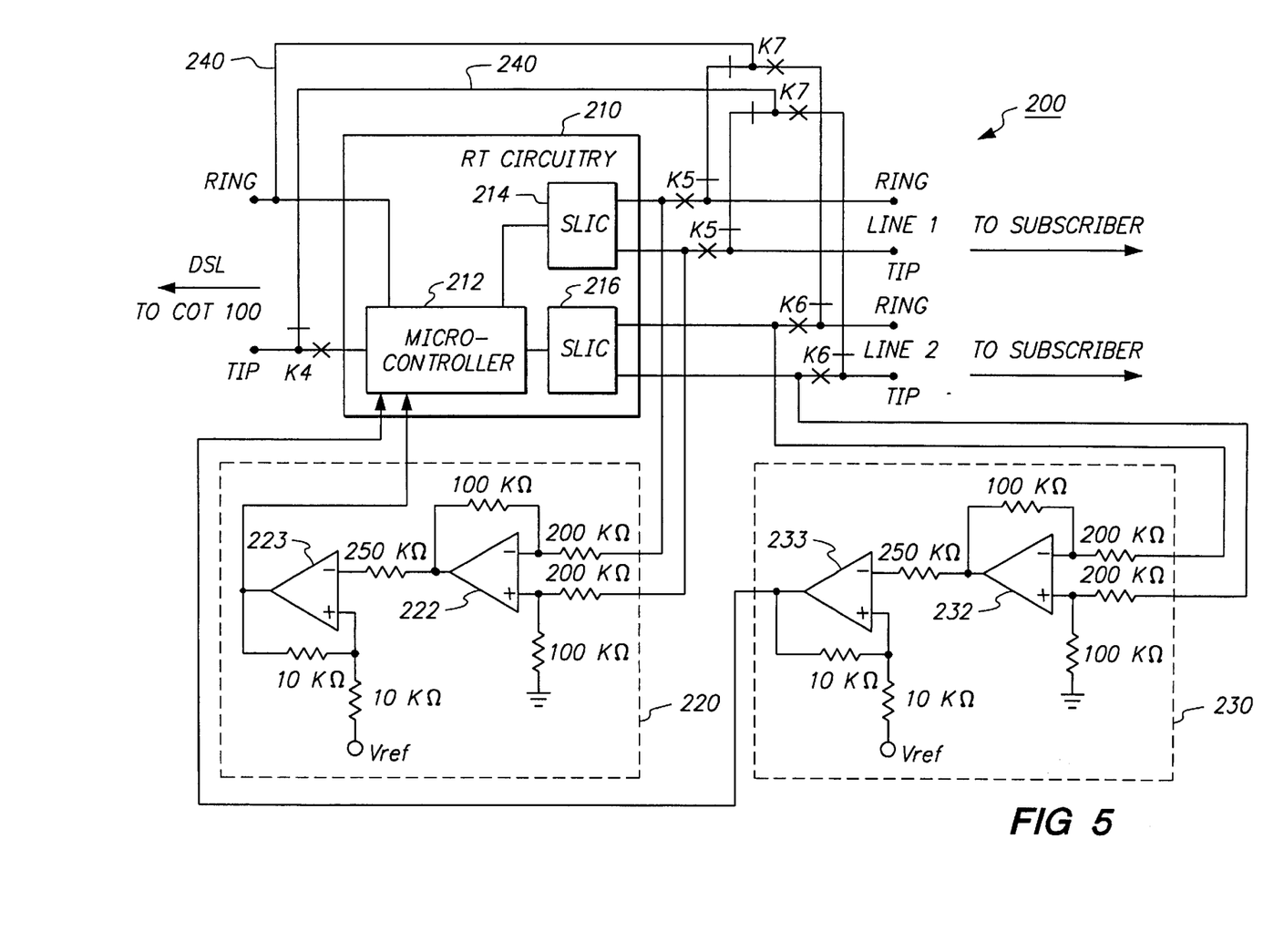
FIG. 5 illustrates a detailed diagram of a remote terminal according to an embodiment of the invention.

FIG. 5 illustrates RT 200 in more detail. In FIG. 5, each of ROH discriminators 220 and 230 comprises the same components and both operate in the similar manner. When an MLT signal comes on line 1, for example, latching relay K7 is switched by microcontroller 212 to connect the ring and tip lines of line 1 to bypass bus 240. Microcontroller 212 also causes a current to be provided from SLIC (Subscriber Line Interface Circuit) 214, e.g., Erricsson SLIC, to an associated ROH discriminator 220.

TABLE 2

Summary of Various Signatures in Different Situations

| LC | RT | Line | Connection Status | Signature Generated in Response to an MLT Signal Detected on the Line | Relays Operated | RTG | RRG | RTR |
|---|---|---|---|---|---|---|---|---|
| Good | Good | 1 | On-hook | Generate Signature "System Busy, Try Again Later" | Ka1, Ka2, K3 | 175k | 175k | 295k |
|  |  | 2 | Off-hook | None | K3 | Open | Open | Emulated Nonlinear at LC |
| Bad | Good | 1 | Any | Generate Signature "COT Failure" | Ka1, Ka5, K3 | 110k | 110k | 17.8k |
|  |  | 2 | Any | Generate Signature "COT Failure" | K8, K9, Ka1, Ka5, K3 | 110k | 110k | 17.8k |
| Good | Bad | 1 | Any | Generate Signature "RT Equipment Failure" | Ka1, Ka2, Ka4, K3 | 90.9k | 90.9k | 17.8k |
|  |  | 2 | Any | Generate Signature "RT Equipment Failure" | K8, K9, Ka1, Ka2, Ka4, K3 | 90.9k | 90.9k | 17.8k |
| Good | Not present | 1 | Any | None | None | MLT | MLT | MLT |
|  |  | 2 | Any | Generate Signature "CPE Not Provisioned" or "Subscriber Channel Unit Missing" | K1, K2, Ka3 | 50k | 50k | 130k |

ROH discriminator 220 comprises a buffer 222 which functions as an amplifier with balanced input impedance, a comparator 223 with hysteresis and a plurality of resistors. When the telephone connected to line 1 is off-hook, SLIC 214 delivers a constant current to the loop comprising line 1 and the telephone. The line voltage of line 1 amplified by buffer 222 is proportional to the line resistance and is fed to comparator 223. Comparator 223 compares the line voltage with a predetermined reference value Vref The reference voltage Vref corresponds to a line resistance of 200 ohms. Therefore, if the output of the comparator indicates that the line voltage is greater than Vref, this indicates that the line resistance is greater than 200 ohms.

According to the current telecommunication standards (Bellcore TR-57), the line impedance without having a telephone set connected should less than 100 ohms for line multiplexers. The telephone impedance is generally greater than 450 ohms. A 200 ohm threshold makes a good differentiation between a short and a ROH (receiver off-hook). Thus, if the line impedance is greater than 200 ohms, it indicates a ROH, but if the line impedance is less than 200 ohms, it indicates a short. If the line impedance is an open circuit, the SLIC will report the status of the telephone as on hook. The comparator output is polled by microcontroller 212, and an appropriate message is sent to COT 100 indicating the status of the line based on the comparator output.

Figure 6:
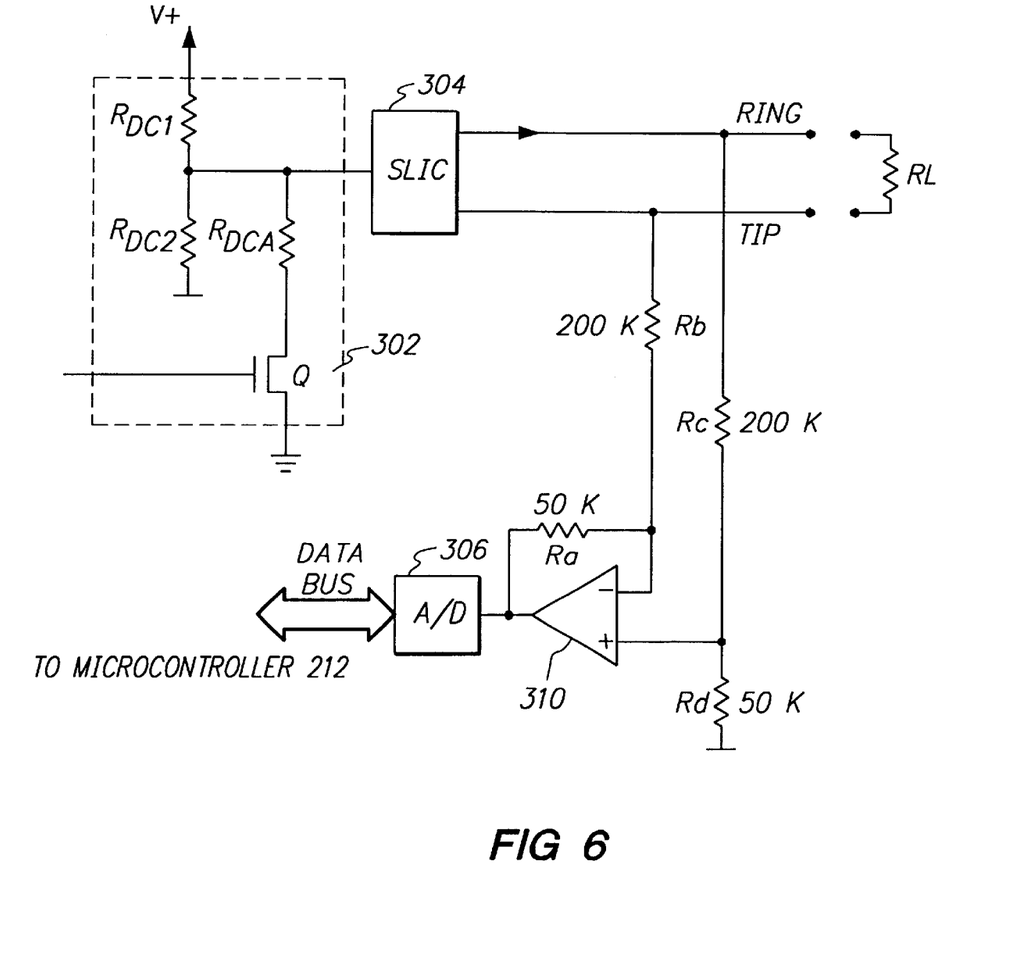
FIG. 6 shows an alternative embodiment of a ROH discriminator according to an embodiment of the invention.

FIG. 6 shows an alternative and more accurate embodiment of the ROH discriminator. The ROH discriminator comprises a current generation circuit 302, a SLIC 304, an analog-to-converter (A/D) converter 306, an amplifier buffer 310 and resistors Ra to Rd. Current generation circuit 302 includes resistors RDC1, RDC2 and RDCA and a transistor Q. The gate electrode of transistor Q is coupled to microcontroller 212. By turning the transistor on and off, two different currents may be applied to the subscriber's loop comprising the telephone line and the telephone. The line voltage between the ring and tip lines is amplified by buffer 310. The amplified line voltage is provided to A/D converter 306, which can be read by the microcontroller, via the data bus, to obtain the digital value of the line voltage.

By measuring the line voltage and thus the line impedance for two different currents, it is possible to determine whether the line impedance is linear (i.e., shorted line) or non-linear (i.e., ROH). Specifically, if the line impedance RL, as measured, is in the range of 200–600 ohms and the two measured values of RL are different by more than 15%, then ROH is indicated. if RL, as measured, is less than 200 ohms, the assumption is that the line is shorted. The line status circuit emulates the line impedance only when the telephone is off hook or shorted. In the on hook situation, the impedance is not emulated.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A system for allowing a test procedure to be performed on a communication system having a transmission line for connecting to telephone exchange and a subscriber line for connecting to a communication set, comprising:

a detector, coupled to the transmission line, for detecting test signals on the transmission line;

a bypass circuit, coupled between the transmission and subscriber lines, for allowing the test signals to bypass the communication system;

a discriminator, coupled to the subscriber line, for discriminating a connection status of the communication set; and a controller, coupled to said detector, said discriminator and said bypass circuit, for activating, in accordance with detection of the test signals and the connection status of the communication set, said bypass circuit so as to allow the test signals to bypass the communication system and connect to the communication set and perform measurements.

2. The system of claim 1, further comprising a status circuit, coupled to said controller, for reproducing, upon discriminating a predetermined connection status of the communication set, the predetermined connection status of the communication set for presenting to the test signals.

3. The system of claim 2, wherein said status circuit reproduces the predetermined connection status by emulating an impedance of a loop comprising the subscriber line and the communication set.

4. The system of claim 3, wherein said status circuit emulates a linear impedance if the connection status discriminated by said discriminator indicates a short status and a non-linear impedance if the connection status discriminated indicates an off-hook status.

5. The system of claim 2, wherein the predetermined connection status includes an off-hook status of the communication set.

6. The system of claim 2, wherein the predetermined connection status includes a short status of the communication set.

7. The system of claim 1, wherein said communication system includes a second transmission line for connecting to the telephone exchange and a second subscriber line for connecting to a second communication set; wherein the first transmission line transmits signals to the first subscriber line and the second transmission line transmits signals to the second subscriber line; and wherein said controller activates said bypass circuit in accordance with the connection statuses of both the communcation sets.

8. The system of claim 7, wherein said controller activates said bypass circuit if the connection statuses of both the communication sets are in an on-hook status.

9. The system of claim 7, wherein the test signals are detected on the first transmission line; wherein said controller activates said bypass circuit if the connection status of the communication set connected to the first subscriber line is in an on-hook status and if the connection status of the communication set connected to the second subscriber line is in a short status.

10. The system of claim 7, further comprising a signature generator, coupled to the first and second transmission lines, for generating a signature, indicative of the communication system status, on one of the transmission lines on which the test signals are detected.

11. The system of claim 10, wherein the test signals are detected on the first transmission line; wherein if the communication set connected to the first subscriber line is in an on-hook status and the communication set connected to the second subscriber line is in an off-hook status, said signature generator generates a system busy signature on the first transmission line, in response to the test signals.

12. The system of claim 1, wherein said discriminator discriminates the connection status by measuring the impedance of a loop comprising the subscriber line and the communication set connected thereto.

13. The system of claim 1, wherein said discriminator includes:
   a current generator for supplying constant current to a loop comprising the subscriber line and the communication set connected thereto;
   an activation circuit, coupled to said current generator, for activating said current generator to supply different constant currents for measuring the impedance of the loop;
   a measuring circuit, coupled to the loop, for measuring a voltage of the loop; and
   a converter, coupled to said measuring circuit, for converting the voltage value into a digital value.

14. The system of claim 13, wherein said current means includes a subscriber line interface circuit.

15. The system of claim 1, wherein the test signals are MLT (mechanized loop test) signals.

16. A communication system, comprising:
   a subscriber line multiplexer transmission system including a central office terminal (COT) and a remote terminal (RT), the COT and RT being connected to each other via a connecting transmission line, the COT including two COT transmission lines for receiving input signals, the RT including two RT transmission lines each for connecting to a communication set and for transmitting signals from an associated COT transmission line to the communication set;
   a detector, coupled to the COT transmission lines, for detecting test signals received on any one of the COT transmission lines;
   a bypass circuit, coupled between the COT transmission lines and the RT transmission lines, for allowing the test signals received on a COT transmission line under test to bypass the COT and the RT and connect to an associated RT transmission line;
   a discriminator, coupled to the RT transmission lines, for discriminating a connection status of a communication set connected to the associated RT transmission line; and
   a controller, coupled to said detector, said discriminator and said bypass circuit, for activating said bypass circuit in accordance with detection of the test signals and the connection status of the communication set, so as to allow the test signals to bypass the COT and the RT and connect to the associated RT transmission line and perform measurements.

17. The system of claim 16, further comprising a status circuit, coupled to said controller, for reproducing, upon discriminating a predetermined connection status of the communication set, the predetermined connection status of the communication set at the COT for presenting to the test signals.

18. The system of claim 17, wherein said status circuit reproduces the predetermined connection status by emulating an impedance of a loop comprising the associated RT transmission line and the communication set.

19. The system of claim 18, wherein said status circuit emulates a linear impedance if the connection status discriminated by said discrimination means indicates a short status and a non-linear impedance if the connection status discriminated indicates an off-hook status.

20. The system of claim 17, wherein the predetermined connection status includes an off-hook status of the communication set.

21. The system of claim 17, wherein the predetermined connection status includes a short status of the communication set.

22. The system of claim 16, wherein said controller activates said bypass circuit in accordance with the connection statuses of both the communcation sets.

23. The system of claim 22, wherein said controller activates said bypass circuit if the connection statuses of both the communication sets are in an on-hook status.

24. The system of claim 22, wherein said controller activates said bypass circuit if the connection status of the communication set connected to the associated RT transmission line is in an on-hook status and if the connection status of the communication set connected to the other RT transmission line is in a short status.

25. The system of claim 16, further comprising a signature generator, coupled to the first and second COT transmission lines, for generating a signature, indicative of the communication system status on the COT transmission line under test.

26. The system of claim 25, wherein if the communication set connected to the associated RT transmission line is in an on-hook status and the communication set connected to the other RT transmission line is in an off-hook status, said signature generator generates a system busy signature on the COT transmission line under test, in response to the test signals.

27. The system of claim 16, wherein said discriminator discriminates the connection status by measuring the impedance of a loop comprising the associated RT transmission line and the communication set connected thereto.

28. The system of claim 16, wherein said discriminator includes:
   a current generator for supplying constant current to a loop comprising the associated RT transmission line and the communication set connected thereto;
   an activation circuit, coupled to said current generator, for activating said current generator to supply different constant currents for measuring the impedance of the loop;
   a measuring circuit, coupled to the loop, for measuring a voltage of the loop; and
   a converter, coupled to said measuring circuit, for converting the voltage value into a digital value.

29. The system of claim 28, wherein said current generator includes a subscriber line interface circuit.

30. The system of claim 16, wherein the test signals are MLT (mechanized loop test) signals.

31. A method for allowing a test procdure to be performed on a communication system which comprises a subscriber line multiplexer transmission system including a central office terminal (COT) and a remote terminal (RT), the COT and RT being connected to each other via a connecting transmission line, the COT including two COT transmission lines for receiving input signals, the RT including two RT transmission lines each for connecting to a communication set and for transferring input signals from an associated COT transmission line to the communication set, the method comprising the steps of:
   detecting test signals received on any one of the COT transmission lines;
   discriminating a connection status of a communication set connected to the associated RT transmission line; and
   in accordance with the connection status of the communication set, allowing the test signals received on the COT transmission line to bypass the COT and the RT and connect to an associated RT transmission line and perform measurements.

32. The method of claim 31 further comprising the step of reproducing, upon discriminating a predetermined connection status of the communication set, the predetermined connection status of the communication set at the COT for presenting to the test signals.

33. The method of claim 32, wherein said reproducing step includes the step of emulating an impedance of a loop comprising the associated RT transmission line and the communication set.

34. The method of claim 33, wherein said emulating step includes the step of emulating a linear impedance if the connection status discriminated indicates a short status and a non-linear impedance if the connection status discriminated indicates an off-hook status.

35. The method of claim 32, wherein the predetermined connection status includes an off-hook status of the communication set.

36. The method of claim 32, wherein the predetermined connection status includes a short status of the communication set.

37. The method of claim 31, wherein said allowing step includes the step of allowing the test signals to bypass the COT and the RT and connect to an associated RT transmission line if the connection statuses of both the communication sets are in an on-hook status.

38. The method of claim 31, wherein said allowing step includes the step of allowing the test signals to bypass the COT and the RT and connect to an associated RT transmission line if the connection status of the communication set connected to the associated RT transmission line on which the test signals are detected is in an on-hook status and if the connection status of the communication set connected to the other RT transmission line is in a short status.

39. The method of claim 31, further comprising the step of generating a signature, indicative of a busy status of the communication system if the communication set connected to the associated RT transmission line is in an on-hook status and the communication set connected to the other RT transmission line is in an off-hook status.

40. The method of claim 31, wherein said discriminating step includes the step of measuring the impedance of a loop comprising the associated RT transmission line and the communication set connected thereto.

41. The method of claim 31, wherein the test signals are MLT (mechanized loop test) signals.

* * * * *